United States Patent
Birkeland et al.

(10) Patent No.: US 9,616,590 B2
(45) Date of Patent: Apr. 11, 2017

(54) ADHESIVE MATERIALS AND METHODS OF FORMING LIGNOCELLULOSIC COMPOSITES USING SUCH ADHESIVE MATERIALS

(71) Applicant: Design Adhesives Inc., Redding, CA (US)

(72) Inventors: Michael J. Birkeland, Madison, WI (US); Raymond Wu, South San Francisco, CA (US); Sean Somers Weaver, Redding, CA (US)

(73) Assignee: Design Adhesives Inc., Redding, CA (US)

( * ) Notice: Subject to any disclaimer, the term of this patent is extended or adjusted under 35 U.S.C. 154(b) by 155 days.

(21) Appl. No.: 14/557,567

(22) Filed: Dec. 2, 2014

(65) Prior Publication Data

US 2015/0151449 A1     Jun. 4, 2015

Related U.S. Application Data

(60) Provisional application No. 61/910,774, filed on Dec. 2, 2013.

(51) Int. Cl.
*B27N 3/00* (2006.01)
*B32B 7/12* (2006.01)
(Continued)

(52) U.S. Cl.
CPC .............. *B27N 3/002* (2013.01); *B32B 7/12* (2013.01); *C08L 97/02* (2013.01); *C09J 189/00* (2013.01);
(Continued)

(58) Field of Classification Search
CPC ...................................... C09J 189/00
(Continued)

(56) References Cited

U.S. PATENT DOCUMENTS

2005/0003189 A1*  1/2005  Bredt .................. B29C 67/0081
                                                          428/402
2013/0302631 A1    11/2013 Li

FOREIGN PATENT DOCUMENTS

EP        2236578 A1    6/2010
WO    2011089053 A1    7/2011
WO    2012040037 A1    3/2012

OTHER PUBLICATIONS

"Int'l Application Serial No. PCT/US2014/068014, Search Report & Written Opinion mailed Feb. 19, 2015", 6 pgs.
(Continued)

*Primary Examiner* — Brent O'Hern
(74) *Attorney, Agent, or Firm* — Kwan & Olynick LLP

(57) ABSTRACT

Provided are adhesive materials for fire resistant applications, methods of using these adhesive materials on lignocellulosic and other like substrates, and composite materials including lignocellulosic substrates and these adhesive materials. In addition to being fire-resistant, the composites formed from the substrates and adhesive materials may be also durable to moisture. The adhesive materials may include at least one proteinaceous-containing material and at least one magnesium oxychloride material. Other materials may be present as well, in some embodiments. For example, an adhesive material may include a solvent or a vinyl polymer. In some embodiments, water may be used as a solvent and the adhesive material may be referred to as an aqueous adhesive material. Some examples of suitable vinyl polymers include but are not limited to polyvinyl alcohol (PVOH), polyvinyl acetate (PVAc) and vinyl acetate/ethylene (VAE).

20 Claims, 8 Drawing Sheets

(51) Int. Cl.
*C09J 189/00* (2006.01)
*C08L 97/02* (2006.01)
*B27N 9/00* (2006.01)

(52) U.S. Cl.
CPC ......... *B27N 9/00* (2013.01); *Y10T 428/24066* (2015.01)

(58) Field of Classification Search
USPC .......................................................... 524/26
See application file for complete search history.

(56) References Cited

OTHER PUBLICATIONS

Misra, A. K. et al., "Magnesium Oxychloride Cement Concrete", Bulletin of Materials Science, vol. 30, No. 3, Jun. 2007, pp. 239-246.

Misra, A.K. et al., "Magnesium Oxychloride Cement Concrete", Research and Industry, vol. 36, Jun. 1991, pp. 78-81.

Sorrell, C. A. et al., "Reactions and Equillibrium in Magnesium Oxychloride Cements", Journal of the American Ceramic Society, vol. 59 (1-2),, Jan.-Feb. 1976, pp. 51-54.

Sorrell, C. A. et al., "The System MgO—MgCl2—H2O at 23 ° C", Journal of the American Ceramic Society. vol. 63 (9-10), Sep.-Oct. 1980, pp. 501-504.

Srivastava, R. S. et al., "Water-Proofing of Magnesium Oxychloride Cement and Current Products", Research and Industry, vol. 28, Sep. 1983, pp. 203-206.

\* cited by examiner

ADHESIVE MATERIALS AND METHODS OF FORMING LIGNOCELLULOSIC COMPOSITES USING SUCH ADHESIVE MATERIALS

CROSS-REFERENCE TO RELATED APPLICATIONS

This application claims the benefit under 35 U.S.C. §119 (e) of U.S. Provisional Patent Application 61/910,774, entitled: "ADHESIVE MATERIALS AND METHOD OF FORMING LIGNOCELLULOSIC COMPOSITES USING SUCH ADHESIVES" filed on Dec. 2, 2013, which is incorporated herein by reference in its entirety.

TECHNICAL FIELD

The present disclosure relates generally to adhesive materials and method of using thereof, and more specifically to adhesive materials having magnesium oxychloride compounds, and proteinaceous materials and method of forming lignocellulosic composites using such adhesive materials, such that adhesive materials are water durable and fire resistant.

BACKGROUND

Lignocellulosic composites are made from small pieces of cellulosic materials that are bonded together using adhesives. In general, wood or other lignocellulosic materials are first processed to yield veneers, strands, fibers and chips. Adhesives are then added to the lignocellulosic materials. The resultant mixture is consolidated using pressure and heat to yield a lignocellulosic composite.

Oriented strand board (OSB) parallel strand lumber (PSL), laminated strand lumber (LSL) and softwood plywood (SWPW) are commonly bonded with thermosetting phenol formaldehyde (PF) or phenol resorcinol formaldehyde (PRF), commonly called "phenolic" resins. The phenolic resins provide excellent wet durability. Particleboard (PB), medium density fiberboard (MDF), hardboard and hardwood plywood (HWPW) have traditionally been bonded with urea formaldehyde. Urea formaldehyde can hydrolyze to produce formaldehyde emissions over the life of the product. Due to increased concern over long term formaldehyde emissions, much of the North American HWPW industry has turned to either soy-based adhesives or polyvinyl acetate (PVAc) as alternative adhesives. Several PB and MDF manufacturers have switched to polymeric methylene diphenyl diisocyanate (pMDI) adhesives as a no-added formaldehyde option.

The adhesives used to bond lignocellulosic materials typically have limited fire resistance and tend to burn as readily as the lignocellulosic substrate. To improve fire resistance, various fire resistant coatings and paints can be applied onto lignocellulosic composites. However, these fire resistant coatings and paints add significant cost and require additional processing steps. Furthermore, these fire resistant coatings and paints can crack and spall thereby reducing fire resistance properties. Fire resistant coatings and paints can employ magnesium oxychloride cements (MOC), which can suffer from poor water resistance. Prolonged exposure of MOC's to water often reduces adhesion between the cement crystals. These drawbacks have significantly limited the use of MOC compounds for lignocellulosic composites.

SUMMARY

Provided are adhesive materials for fire resistant applications, methods of using these adhesive materials on lignocellulosic and other like substrates, and composite materials including lignocellulosic substrates and these adhesive materials. In addition to being fire-resistant, the composites formed from the substrates and adhesive materials may be also durable to moisture. The adhesive materials may include at least one proteinaceous-containing material and at least one magnesium oxychloride material. Other materials may be present as well, in some embodiments. For example, an adhesive material may include a solvent or a vinyl polymer. In some embodiments, water may be used as a solvent and the adhesive material may be referred to as an aqueous adhesive material. Some examples of suitable vinyl polymers include but are not limited to polyvinyl alcohol (PVOH), polyvinyl acetate (PVAc) and vinyl acetate/ethylene (VAE).

In some embodiments, an aqueous adhesive material includes a magnesium oxychloride compound and a proteinaceous material. The relative amounts of these materials may be selected based on desirable characteristics of the aqueous adhesive material. In some embodiments, the dry weight ratio of the protein in the proteinaceous material is at least about 40%. The dry weight ratio of the magnesium oxychloride compound and the proteinaceous material in the aqueous adhesive material may be at least about 50%.

In some embodiments, the magnesium oxychloride compound has a molar ratio of MgO to $MgCl_2$ of between about 1:1 and 30:1 or, more specifically, between about 5:1 and 20:1 or even between about 10:1 and 15:1.

In some embodiments, the aqueous adhesive material includes a vinyl polymer. The vinyl polymer may be one of PVOH, PVAc, and VAE, or mixtures thereof. In specific embodiments, the vinyl polymer is PVAc. In the same or other embodiments, the vinyl polymer is VAE. In some embodiments, the vinyl polymer is a combination of VAE and PVAc.

In some embodiments, the proteinaceous material is derived from one or more materials selected from the group consisting of soy, wheat, corn, cotton, rapeseed, peanut, algea, egg, milk, blood and mixtures thereof. For example, the proteinaceous material may be derived from soy. Alternatively, the proteinaceous material may be derived from wheat. Furthermore, the proteinaceous material may be derived from corn.

Provided also is a method for producing a lignocellulosic composite. The method may involve providing an aqueous adhesive material having a magnesium oxychloride compound and a proteinaceous material. The method may also involve applying the aqueous adhesive material to a lignocellulosic substrate and curing the aqueous adhesive material. The curing of the aqueous adhesive material forms the lignocellulosic composite. The aqueous adhesive material may be applied to the lignocellulosic substrate at a concentration of from about 1 to about 25 weight % based on the total dry weight of the adhesive composition excluding solvent relative to the dry weight of the lignocellulosic substrate.

In some embodiments, the curing of the aqueous adhesive material involves applying a pressure of between about 10 and 1000 psi to the combination of the aqueous adhesive material and the lignocellulosic substrate. In some embodiments, the curing of the aqueous adhesive material is performed at a temperature of between about 50° C. and 250° C. The lignocellulosic substrate may be one of ground wood pulp, sawdust, wood particles, wood strand, wood veneer, wood wafer, and wood sheathing.

In some embodiments, a lignocellulosic composite includes a lignocellulosic substrate and a cured adhesive material having a magnesium oxychloride compound and a proteinaceous material. The lignocellulosic composite may be selected from one of hardwood plywood, softwood plywood, particleboard, medium density fiberboard, oriented strandboard, waferboard, fiberboard, parallel strand lumber, laminated strand lumber and a hardwood veneered product.

These and other embodiments are described further below with reference to the figures.

DETAILED DESCRIPTION

Figure 1:
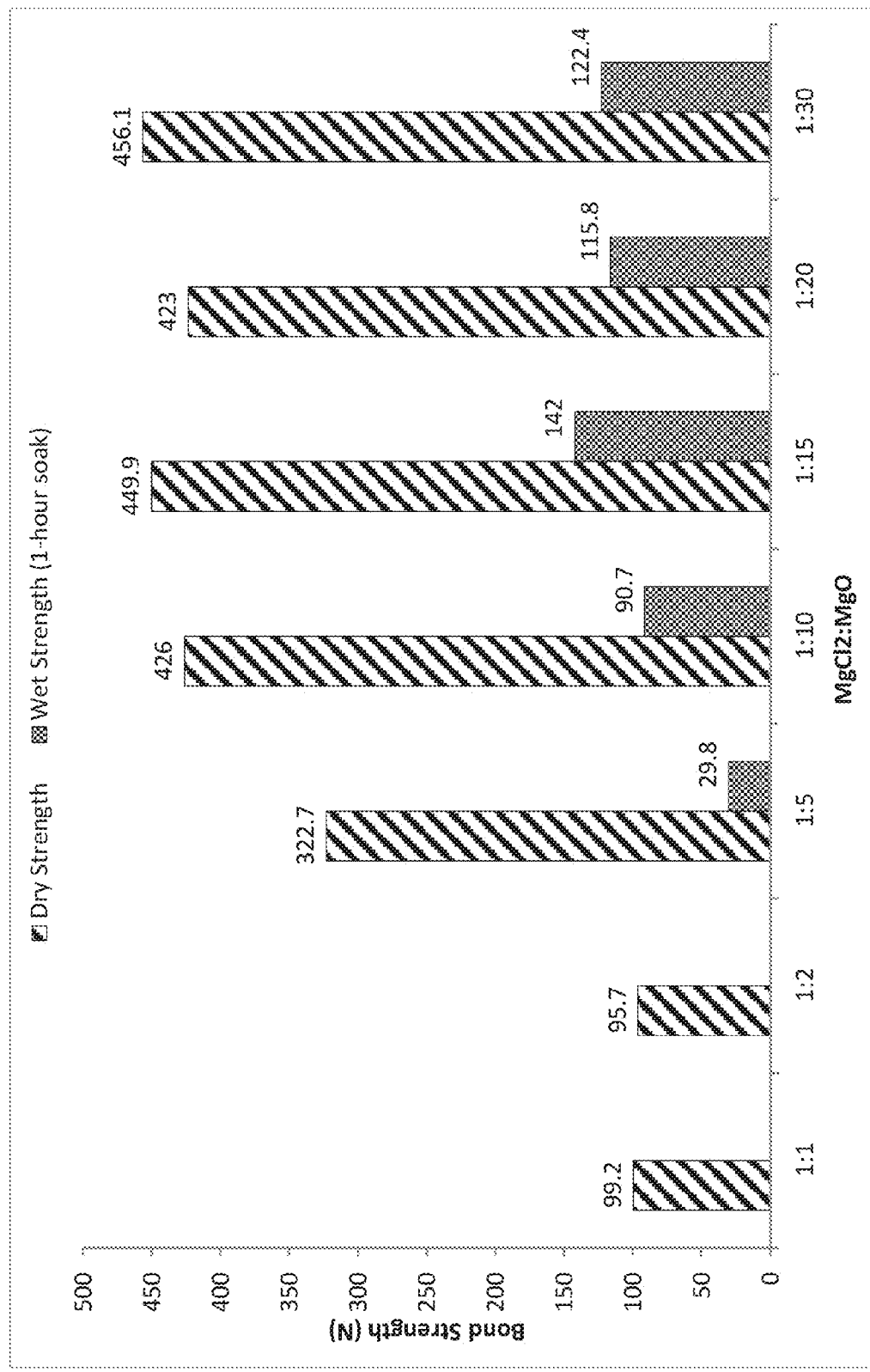
FIG. 1 shows the data for dry/wet Automated Bonding Evaluation System (ABES) strength of the protein-magnesium oxychloride adhesive formulations as a function of altering the magnesium oxide to magnesium chloride molar ratio.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Magnesium oxychloride (MOC) cement may be also referred to as magnesite or Sorel cement. MOC cement has a variety of favorable properties including low thermal conductivity, high fire resistance, resistance to abrasion and good crushing strengths. Furthermore, MOC cement bonds well to a variety of inorganic and organic materials, such lignocellulosic material. For purposes of this disclosure, a "lignocellulosic material" is defined as a material derived from a dried plant matter. The lignocellulosic material may include one or more carbohydrate polymers, cellulose and hemi-cellulose, aromatic polymers, lignin in the ratio of 25-55% cellulose, 25-50% hemicellulose and 15-40% lignin. Some examples of lignocellulosic material include but not limited to wood from hardwood or softwood trees, corncobs, nutshells, sugarcane bagasse, grasses, straw, bamboo and recycled products thereof.

The main bonding phases of the cement are $Mg(OH)_2$, $5Mg(OH)_2$—$MgCl_2$-$8H_2O$ (also known as MOC-5 bonding phase) and $3Mg(OH)_2$—$MgCl_2$-$8H_2O$ (also known as MOC-3 bonding phase). The high fire resistance of MOC cement is due to the relatively large amounts of bound water in the MOC-5 and MOC-3 bonding phases, 44% and 49% by weight, respectively. The water molecules are bound tightly in the structure of the MOC cement. When heated to 297° C., the bound water is converted to steam requiring an energy input of about 1000 Btu per pound of water released. Thus, MOC cement cannot be heated above this temperature until all bound water is released.

For the purposes of this document, "fire resistance" is defined as the time required for the temperature on the exterior side of a specimen to reach 300° C. when held vertically and exposed to natural gas flames inside a furnace that is controlled to follow a time temperature curve specified in ASTM E119 "Standard Test Methods for Fire Tests of Building Construction and Materials."

One drawback of MOC cement, which has severely limited its application for lignocellulosic composites, is its low resistance to water. Contact with water results in leaching of the magnesium chloride and severe weakening of the cement bond. Yet, most lignocellulosic composites require some level of water durability. As such, MOC alone is not suitable for lignocellulosic composite applications. For purposes of this document, a composite is defined as water durable if the composite can pass the necessary moisture resistance testing as defined in the standards listed in Table I

TABLE I

| Composite Type | Test Description | Standard Reference |
| --- | --- | --- |
| HWPW | 3-Cycle Soak Delamination Cyclic Boil Shear Test | ANSI/HPVA HP-1-2009 |
| SWPW | Vacuum Pressure Shear Test Cyclic Boil Shear Test | PS1-07 |
| OSB | Hot Water Vacuum Pressure Soak Delamination/Strength Test | PS2-10 |
| PB/MDF | Accelerated Aging Cycle Strength Retention | ASTM 1037-06a |

$Mg(OH)_2$ and MOC may be combined with vinyl polymers, which are good adhesives for lignocellulosic materials. Specifically, the vinyl polymers improve bonding to substrates and at least maintain or improve the water content of the resulting adhesive material. However, vinyl polymers have a thermoplastic nature, which presents processing difficulties for establishing strong hot-bonds. These bonds are needed to overcome internal steam pressure of hot-pressed lignocellulosic composites. Furthermore, without appropriate cross-linking component, vinyl polymers typically do not meet the durability requirements of lignocellulosic composites.

It has been unexpectedly found that adding proteinaceous materials to form aqueous adhesive materials containing MOC compounds can improve the properties of these aqueous adhesive materials. For purposes of this disclosure, "proteinaceous material" is defined as a material having more than about 10% protein content. Specifically, starch and protein based adhesive systems have been used in some adhesive systems. Other examples include casein protein from milk, egg white protein and soy protein from oil extracted soy beans. Although excellent dry strengths may be obtained with protein based adhesive systems (i.e., the systems without MOC compounds), such adhesive systems generally suffer from poor water resistance.

It has been found that various combinations of MOC and a proteinaceous material offer bonding properties to lignocellulosic materials, fire resistance characteristics, and water durability for lignocellulosic composite applications. In some embodiments, the magnesium oxychloride compound can be made with a molar ratio of MgO to $MgCl_2$ of between about 1:10 and 30:1 or, more specifically, between about 5:1 and 20:1, and even between about 10:1 and 15:1 (as, for example shown in FIG. 1).

The adhesive material may also include various additives, such as vinyl polymer, magnesium sulfate and soluble phosphate salts including ammonium, aluminum, zinc, calcium and potassium, which can be used to improve reactivity, water resistance, and strength. Additives, such as borax, acid catalysts (e.g., para-toluene sulfonic acid) and other salts, may be used to enhance or retard the adhesive material cure.

Examples of vinyl polymers that can be used for adhesive materials include, but are not limited to, poly vinyl acetate (PVAc), poly vinyl alcohol (PVOH), vinyl ethylene acetate (VAE), and similar molecules with a variety of copolymers and side chain modifications.

The amount of vinyl polymer in the adhesive material may be between about 1% and 30% or, more specifically, between about 5% and 20%, and even between about 10% and 15% based on the dry weight (solvents excluded) of the adhesive material.

Figure 2:
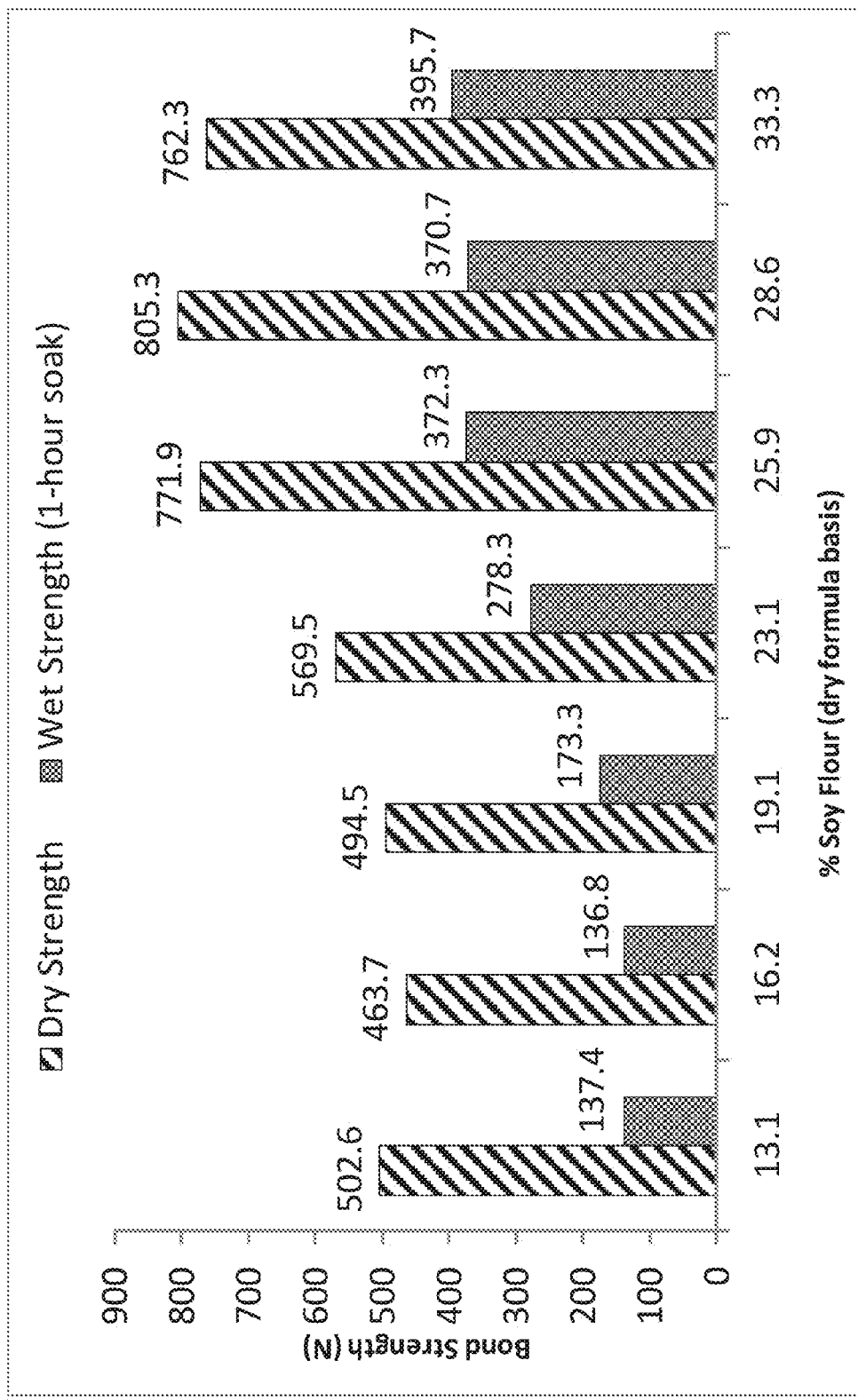
FIG. 2 shows the data for dry/wet ABES strength of the protein-magnesium oxychloride adhesive formulations as a function of altering the level of protein incorporation.

In some embodiments, proteinaceous materials can include, but is not limited to, protein derived from vegetable source, such as soy, corn, wheat, zein, rapeseed, peanut, and cotton. Furthermore, proteinaceous materials can include, but is not limited to, protein derived from animal sources, such as algea, egg, milk and blood. The proteinaceous material may be incorporated at a concentration of between about 1% and 75% by weight or, more specifically, between about 5% and 50%, or even between about 20% and 30% based on the dry weight (solvents excluded) of the adhesive material (as, for example, shown in FIG. 2).

The adhesive materials described herein may be used to bond lignocellulosic substrates, such as hardwood plywood, softwood plywood, particleboard, medium density fiberboard, oriented strandboard, waferboard, fiberboard, parallel strand lumber, laminated strand lumber and a hardwood veneered product. A combination of a lignocellulosic substrate and adhesive material may be referred to as a lignocellulosic composite.

Figure 3:
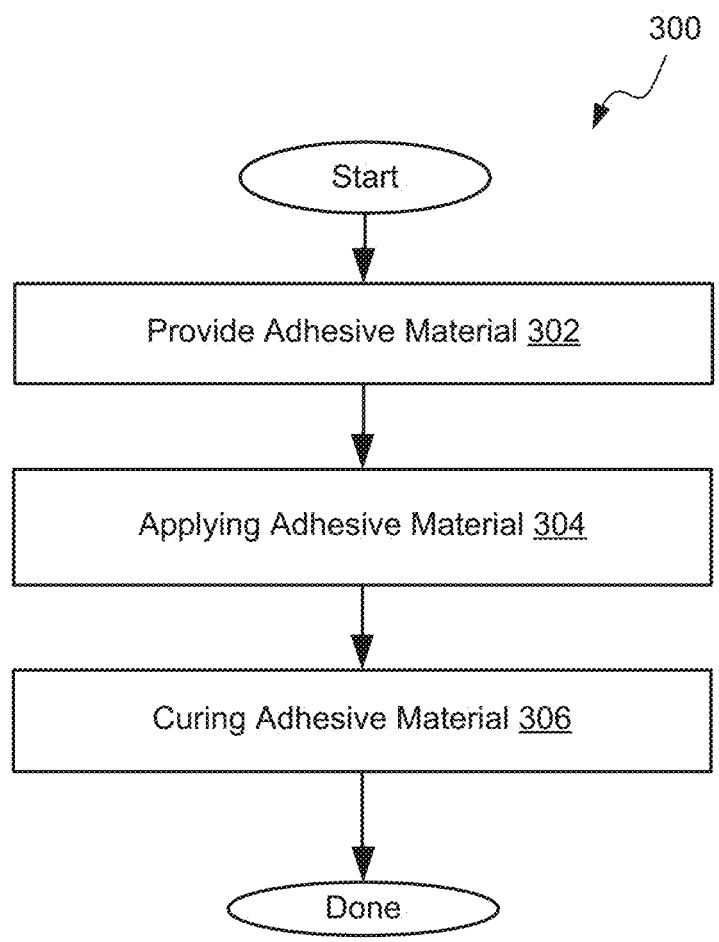
FIG. 3 is a process flowchart corresponding to method for producing a lignocellulosic composite, in accordance with some embodiments.

FIG. 3 is a process flowchart corresponding to method 300 for producing a lignocellulosic composite, in accordance with some embodiments. Method 300 may commence with providing an aqueous adhesive material during operation 302. Various examples of such adhesive materials are described above. In some embodiments, the adhesive material provided during operation 302 includes a magnesium oxychloride compound, a vinyl polymer, and a proteinaceous material.

Method 300 may proceed with applying the aqueous adhesive material to a lignocellulosic substrate during operation 306. The aqueous adhesive material may be applied to the lignocellulosic substrate at a concentration of from about 1 to about 25 weight % based on the total dry weight of the adhesive composition excluding solvent relative to the dry weight of the lignocellulosic substrate. The lignocellulosic substrate may be one of ground wood pulp, sawdust, wood particles, wood strand, wood veneer, wood wafer, and wood sheathing.

Method 300 may then proceed with curing the aqueous adhesive material during operation 306. Curing the aqueous adhesive material forms the lignocellulosic composite. In some embodiments, curing the aqueous adhesive material involves applying pressure of between about 10 and 1000 psi or, more specifically, between 50 psi and 500 psi. The pressure may be applied between two lignocellulosic substrates when the adhesive materials disposed between these two substrates. In some embodiments, curing the aqueous adhesive material is performed at a temperature of between about 50° C. and 250° C. A higher curing temperature may be beneficial for expediting the curing process, but at some level the high temperature may require excessive heating energy, which may be cost prohibitive. Furthermore, the excessive temperature may cause decomposition of some components in the adhesive materials and undesirable reactions.

Figure 4A:
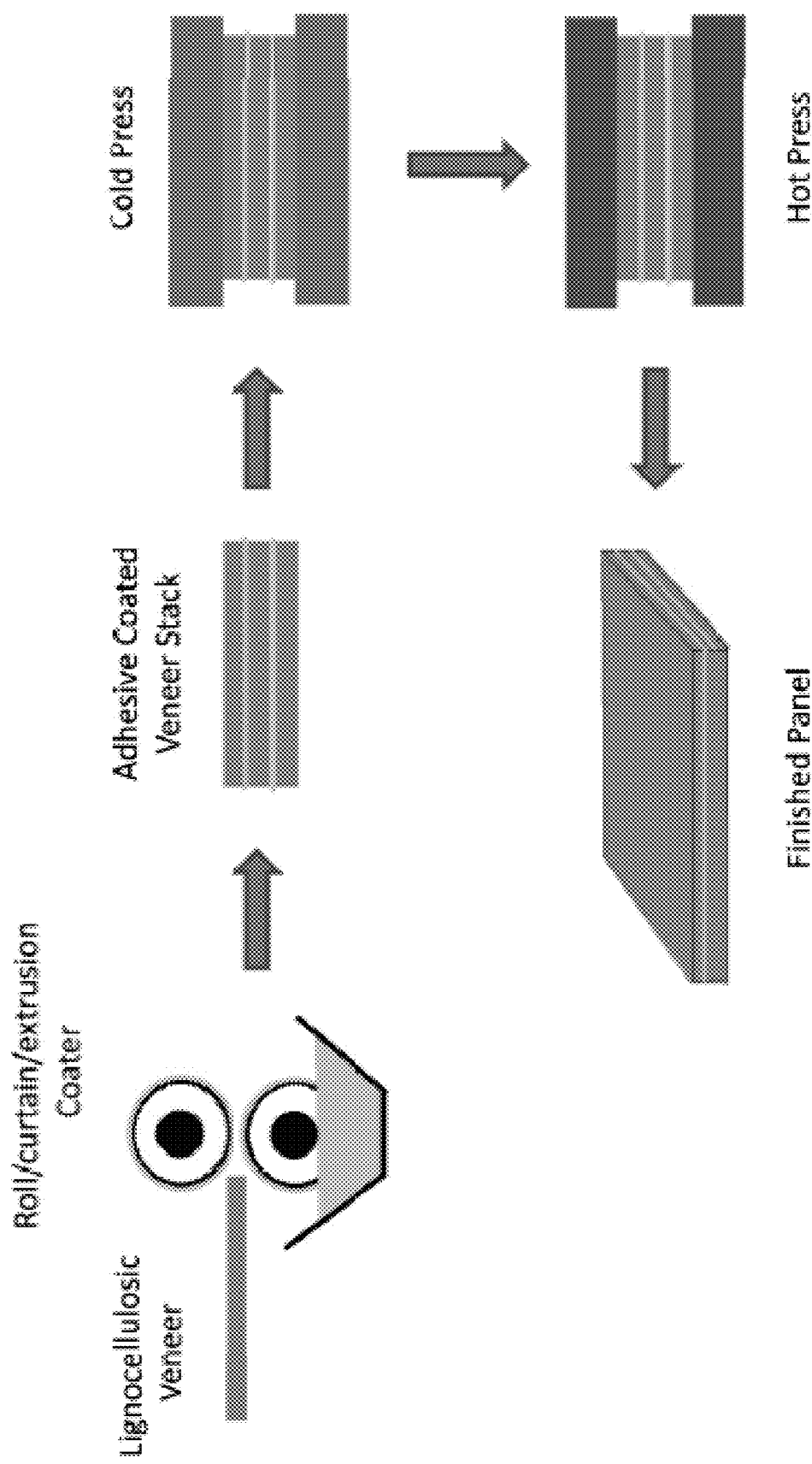
FIG. 4A illustrates various stages of a method for producing a lignocellulosic composite using a veneer or other lignocellulosic material, in which an adhesive material is applied as a layer onto a relatively smooth surface of the veneer or other lignocellulosic material, in accordance with some embodiments.
Figure 4B:
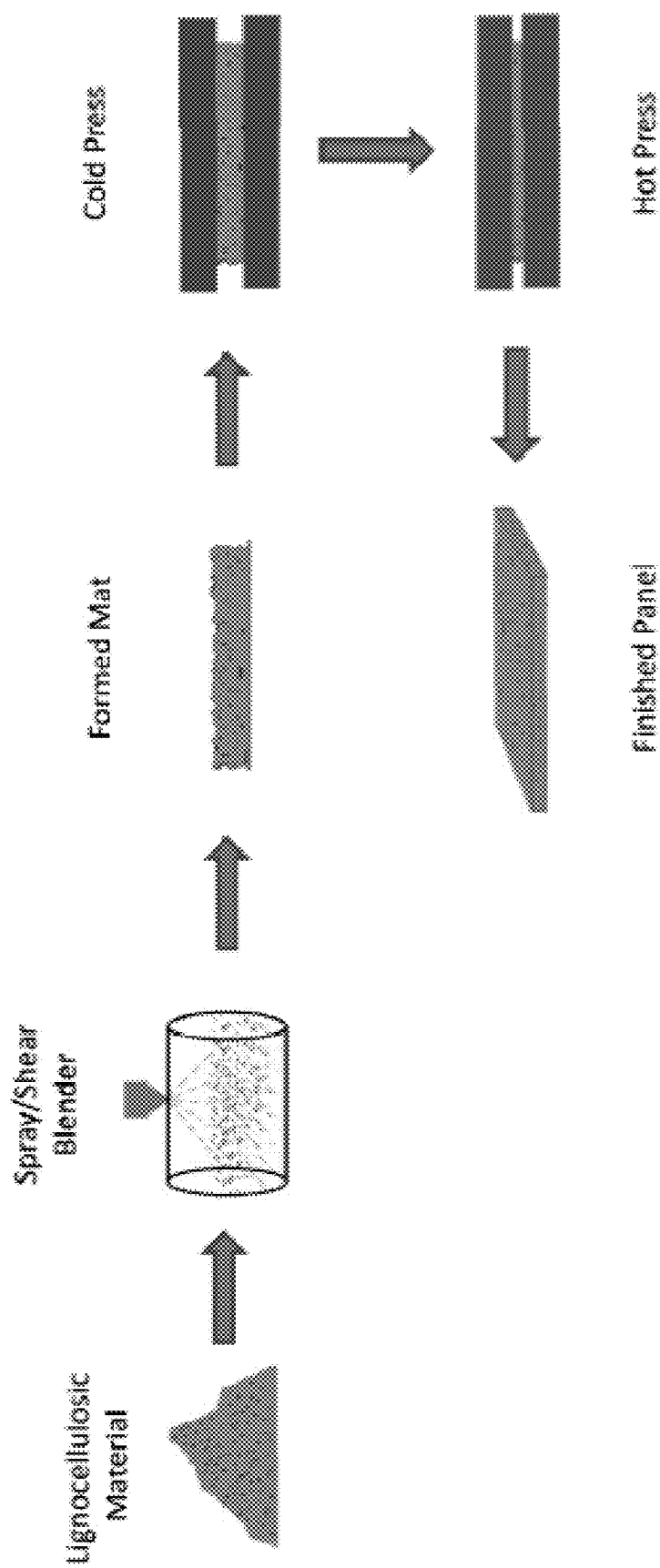
FIG. 4B is illustrates various stages of a method for producing a lignocellulosic composite using particles or strands of lignocellulosic material, in which an adhesive material is applied as onto the particles or strands of lignocellulosic material using spraying, in accordance with some embodiments.

FIG. 4A illustrates various stages of a method for producing a lignocellulosic composite using a veneer or other lignocellulosic material when an adhesive material is applied as a layer onto a relatively smooth surface of the veneer or other lignocellulosic material. FIG. 4B is illustrates various stages of a method for producing a lignocellulosic composite using particles or strands of lignocellulosic material, in which an adhesive material is applied as onto the particles or strands of lignocellulosic material using spraying. Furthermore, adhesive materials described herein may also be applied as a surface coating onto prefabricated lignocellulosic composites to improve fire resistance and other properties of these composites.

The amount of adhesive material may be between about 1% and 25% by weight or, more specifically, between about 5% and 15%, or even between about 8% and 12% based on the dry weight basis of the lignocellulosic composite. The amount of adhesive material above 25% may be process prohibitive due to the high level water, which would be introduced into a mixture as a part of the adhesive material. High moisture content in the lignocellulosic composite prior to curing will typically require excessive press times and/or high drying capacity, which may not be suitable for processing.

The resultant moisture content (defined as the total water content introduced into the mixture as a part of the lignocellulosic material and the adhesive material divided by the total mass of the mixture prior to curing) of the lignocellulosic composite may be between about 1% and 20% or, more specifically, between about 3% and 15%, or even between about 7% and 12%. The moisture contents above 20% is generally process prohibitive, requiring excessive press times and/or high drying capacity.

Also provided are methods for producing a lignocellulosic composite. The method may involve providing an aqueous adhesive material including a magnesium oxychloride compound, a vinyl polymer, and a proteinaceous material. The method may also involve applying the aqueous adhesive material to a lignocellulosic substrate either by roll coater, spray blender or shear blender, depending on the type of composite and curing the resultant adhesive/lignocellulosic material. This curing of the aqueous adhesive material forms the lignocellulosic composite.

During the curing operation, a combination of the aqueous adhesive material and the lignocellulosic substrate may be compressed and/or heated. The pressure used may be between about 50 psi and 500 psi or, more specifically, between about 100 psi and 300 psi, or even between about 125 psi and 200 psi. The temperature used for curing may be between about 100° C. and 220° C. or, more specifically, between about 105° C. and 180° C. or even between about 110° C. to 150° C. The time of applying this pressure and/or the heat should be sufficient to allow the center most bond line or section of the panel to reach about 100° C. for at least one second. In some embodiments, the lignocellulosic composite is cured without additional heating (e.g., at a room temperature and using pressure only). The pressure used may be between about 50 psi and 500 psi or, more specifically, between about 100 psi and 300 psi, or even between about 125 psi and 200 psi. This pressure may be applied for between about 1 hour and 48 hours or, more specifically, between about 8 hours and 24 hours or even between about 12 and 18 hours.

The lignocellulosic composite formed using these methods and materials may have improved fire resistance due to the presence of MOC. Without being restricted to any particular theory, it is believed that the water bound to MOC causes a significant absorption of heat, while the water vaporizes. This feature is generally not available in other materials used for bonding bond lignocellulosic, which are often composed mainly from organic materials that heat and burn as readily as the lignocellulosic material.

In some embodiments, an organic acid may be added to the adhesive material (that already includes a magnesium oxychloride compound, a vinyl polymer, and a proteinaceous material) in order to adjust the pH level and thereby to increase the rate of hardening. Examples of organic acids used for pH adjustment include tartaric acid (L-(+)-tartaric acid, D-(+)-tartaric acid, racemic tartaric acid, etc.) salicylic acid, citric acid, succinic acid, lactic acid, fumaric acid, benzoic acid, capric acid, caprylic acid, lauric acid, myristic acid, palmitic acid, stearic acid, isostearic acid, maleic acid, malic acid, adipic acid, sorbic acid, polycarboxylic acid and the like. In some embodiments, the tartaric acid is used.

In some embodiments, fatty alcohol polyoxyethylene ethers may be added to the adhesive material (that already includes a magnesium oxychloride compound, a vinyl polymer, and a proteinaceous material) to increase tackiness and thereby to improve handling characteristics and to increase bond strength between wood layers. In some embodiments, fatty alcohol polyoxyethylene ether can be replaced with sodium lauryl polyoxyethylene ether sulfate or fatty amine polyoxyethylene ether.

A nonionic surfactant may be used as an emulsifier in the preparation of adhesive materials, e.g., that includes a magnesium oxychloride compound, a vinyl polymer, and a proteinaceous material. Some examples of non-ionic surfactants include polyoxyethylene octylphenol ethers and the like, polyoxyethylene alkyl ethers (e.g., polyoxyethylene lauryl ether), polyoxyethylene alkylphenol ethers (e.g., polyoxyethylene octylphenol ether or polyoxyethylene nonylphenol ether), and polyoxyethylene sorbitan fatty acid esters (e.g., polyoxyethylene sorbitan monolaurate or polyoxyethylene sorbitan monooleate), and/or related nonionic surfactants.

In some embodiments, the adhesive material may include one or more pigment materials, such as lithopone powder. The lithopone powder is a mixture of barium sulfate and zinc sulfide. The pigment materials may be used to impart a particular color (e.g., whitish color) to the adhesive as well as to the finished composite. Examples of pigments include white lead, zinc oxide, zinc sulfide, basic lead sulfate. Other examples include yellow pigments, such as cadmium lithopone, zinc chromate, ocher, ferrite yellows, and litharge, or red pigments, such as red lead, iron oxide, cadmium reds, and the black pigments, such as lamp black, carbon black, graphite and/or magnetite black.

In some embodiments, magnesium chloride may be replaced with magnesium sulfate to provide similar fire resistance characteristics. However, magnesium oxysulphates tend to have superior water resistance performance. As such, magnesium chloride may be used for applications that do not need superior water resistance performance of the resulting composite. Furthermore, magnesium chloride may be replaced with soluble phosphate salts for superior water resistance performance. Magnesium oxyphosphate is known to have enhanced water resistance and good freeze/thaw resistance.

In some embodiments, the magnesium oxide compound may be enhanced by including small amounts of calcium oxide, for example 0.5% to 3% calcium oxide, preferably 0.5% to 2% calcium oxide, for example 1.5% calcium oxide. One example of a suitable magnesium oxide product is OXYMAG® (available from Premier Chemicals). 99.5% of OXYMAG® passes through a 200 mesh screen. OXYMAG® also includes a calcium oxide additive.

Soy flour may be replaced with or combined with wheat flour, corn flour, cotton flour, rapeseed flour, peanut flour, as well as concentrates and/or isolates thereof, algea protein, blood protein, milk protein and egg protein without departing from the spirit and scope of the invention as set forth herein. Sulfonic acids may be chosen from the group comprising methyl naphthalene sulfonic acid, ethyl sulfonic acid, p-toluene sulfonic acid, preferably methyl sulfonic acid, and more preferably vinyl sulfonic acid. However, other related sulfonic acid derivatives may also be employed.

ABES Sample Preparation/Testing Procedure

Wood samples were stamped out using the ABES stamping apparatus from Maple veneer such that the final dimensions were 11.7 cm along the grain, 2.0 cm perpendicular to the grain and 0.08 cm thick. The adhesive to be tested was applied to one end of the sample such that the entire overlap area is covered, generally being in the range of 3.8-4.2 mg/cm$^2$ on a wet basis. The sample was then bonded to a second veneer (open time of less than 15 seconds to ensure excellent transfer) and placed in the ABES unit such that the overlap area of the bonded samples was 0.5 cm by 2.0 cm. Unless otherwise noted, all samples were pressed for 2.0 minutes at 120° C., with 9.1 kg/cm$^2$ of pressure. All bonded samples were then allowed to condition for at least 24 hours in a controlled environment at 22° C. and 50% relative humidity.

For each composition, six (6) ABES samples were prepared in the manner described above. After conditioning, three (3) samples were tested dry by placing them into the ABES. The maximum strength upon sample breakage was recorded. These are termed the dry strength samples. The remaining three (3) samples were placed in room temperature water for one (1) hour, removed, blotted dry and tested wet by placing them into the ABES. The maximum strength upon sample breakage was recorded. These are termed the wet strength samples. For each composition, the values reported are the average of three tests with error bars reported as standard deviation.

Plywood Preparation/Testing Procedure

Veneers used were 12"×12" Yellow Poplar ⅙-⅛" thick. The adhesive to be tested was first applied to one side of the center veneer. The top veneer is then placed over this side such that the grain of the two veneers is perpendicular. There is no specific open time for this process. The adhesive is then applied to the other side of the center veneer and the bottom veneer is placed over this side such that the grain of the two veneers is perpendicular. Typical adhesive loads range from 21.5 to 22.5 mg/cm$^2$ per glue line on a wet basis. The assembled three-ply is then pre-pressed for five minutes at 22° C. and 100 psi. The three-ply is then pressed for five minutes at 115° C. and 150 psi. Samples are conditioned at 26° C. and 30% relative humidity for at least 48 hours before testing. Samples were tested using ANSI/HPVA HP-1-2004 4.6 "Three-cycle Soak Test."

Materials

Magnesium oxide (MgO) was obtained from Martin Marietta Magnesia Specialties (Raleigh, N.C.). Magnesium chloride hexahydrate (MgCl$_2$-6H$_2$O), para-toluene sulfonic acid (p-TSA) and tartaric acid (TA) were obtained from Sigma Aldrich (Milwaukee, Wis.). Poly vinyl acetate (PVAc) was obtained from Franklin International (Columbus, Ohio). Soy protein flour, SPF (5% moisture content) was obtained from Cargill Incorporated (Minneapolis, Minn.). Soy protein isolate, SPI (5% moisture content) was obtained from Archer Daniels Midland (Decatur, Ill.). Polyamino-amido epichlorohydrin (PAE) was obtained from Georgia Pacific (Atlanta, Ga.). Maple veneers and yellow poplar veneers were provided by Columbia Forest Products (Greensboro, N.C.).

EXAMPLE 1

In this example, a total of 16.2 grams of MgCl$_2$-6H$_2$O was dissolved into 29.9 grams of deionized water. To this, 0.4 grams of 12.1% p-TSA solution and 2.4 grams of a 45.5% TA solution were added. Next, 9.7 grams of PVAc (55% solids content) was blended into the reaction followed by 32.1 grams of MgO. Upon mixing to homogeneity, 9.4 grams of soy flour was added and the entire reaction stirred for 30 minutes until homogeneous. The order of addition of the materials was found to be not critical. The molar ratio of the MgO:MgCl$_2$ in this example is 10:1. The PVAc was at 9.7% of the total solids of the formulation and soy flour was 16.2% of the total solids of the formulation. The resultant adhesive, which will be referred herein as Composition A, was used to prepare samples using the ABES as described above.

EXAMPLE 2

In this example, a total of 20.4 grams of MgCl2-6H2O were dissolved into 178.1 grams of deionized water. To this was added 60.5 grams of MgO and the solution was allowed to stir for 15 minutes. To this was added 29.3 g of SPI and the mixture was allowed to stir for 30 minutes. The molar ratio of the MgO:MgCl$_2$ in this example is 15:1. The SPI is 28.5% of the total solids of the formulation. The resultant adhesive, which will be referred herein as Composition B, was used to prepare samples using the ABES as described above as well as plywood samples as described above.

EXAMPLE 3

In this example, a soy flour PAE control sample was prepared by dispersing 105.0 grams of PAE followed by 62.8 grams of soy flour into 170.8 grams of deionized water while mixing. Next, 0.6 grams of sodium metabisulfite was added followed by 62.5 grams more of soy flour. The blend was stirred for five minutes until homogeneous. The resultant adhesive, which will be referred herein as Composition C, was used to prepare samples using the Automated Bonding Evaluation System (ABES) as described above as well as plywood samples as described above.

Figure 5:
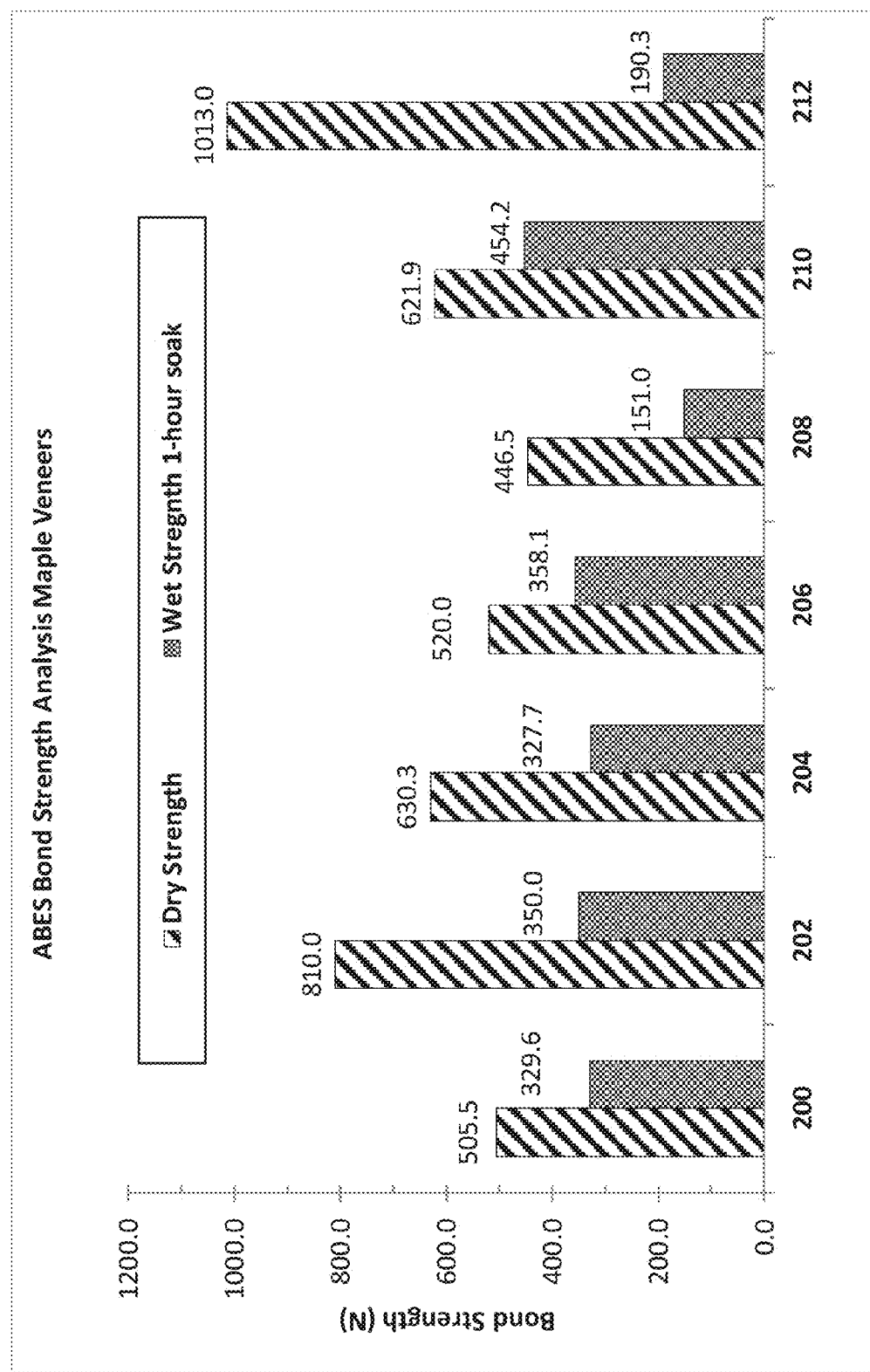
FIG. 5 shows the data for dry/wet ABES strength of the protein-magnesium oxychloride adhesive formulation compared to typical resin systems used to bond lignocellulosic material.

FIG. 5 shows the ABES strength data for composition A (bars 200) and composition B (bars 202). Additionally included in FIG. 5 are data for adhesives typically used to bond lignocellulosic materials including: composition C—soy-PAE (bars 204) urea formaldehyde (UF) (bars 206), phenol formaldehyde (PF) (bars 208 and 210), and PVAc (bars 212). For phenol formaldehyde, higher cure temperatures are required to obtain full cure. As such, the data for phenol formaldehyde is shown at both 120° C. (bars 208) and 150° C. (bars 210). It is clear from the data that compositions A and B perform on par with other commonly used lignocellulosic binders.

Table II shows the 3-cycle soak test results for plywood panels prepared as described above using compositions A and B as well as composition C for comparison. It is clear from the data that compositions A and B perform comparably to the soy-PAE binder system commonly used to bond HWPW.

TABLE II

| Adhesive | # of samples failed/total # of samples | |
| --- | --- | --- |
| | Cycle 1 | Cycle 3 |
| Composition A | 1/4 | 4/4 |
| Composition B | 0/4 | 0/4 |
| Composition C | 0/4 | 0/4 |

Figure 6:
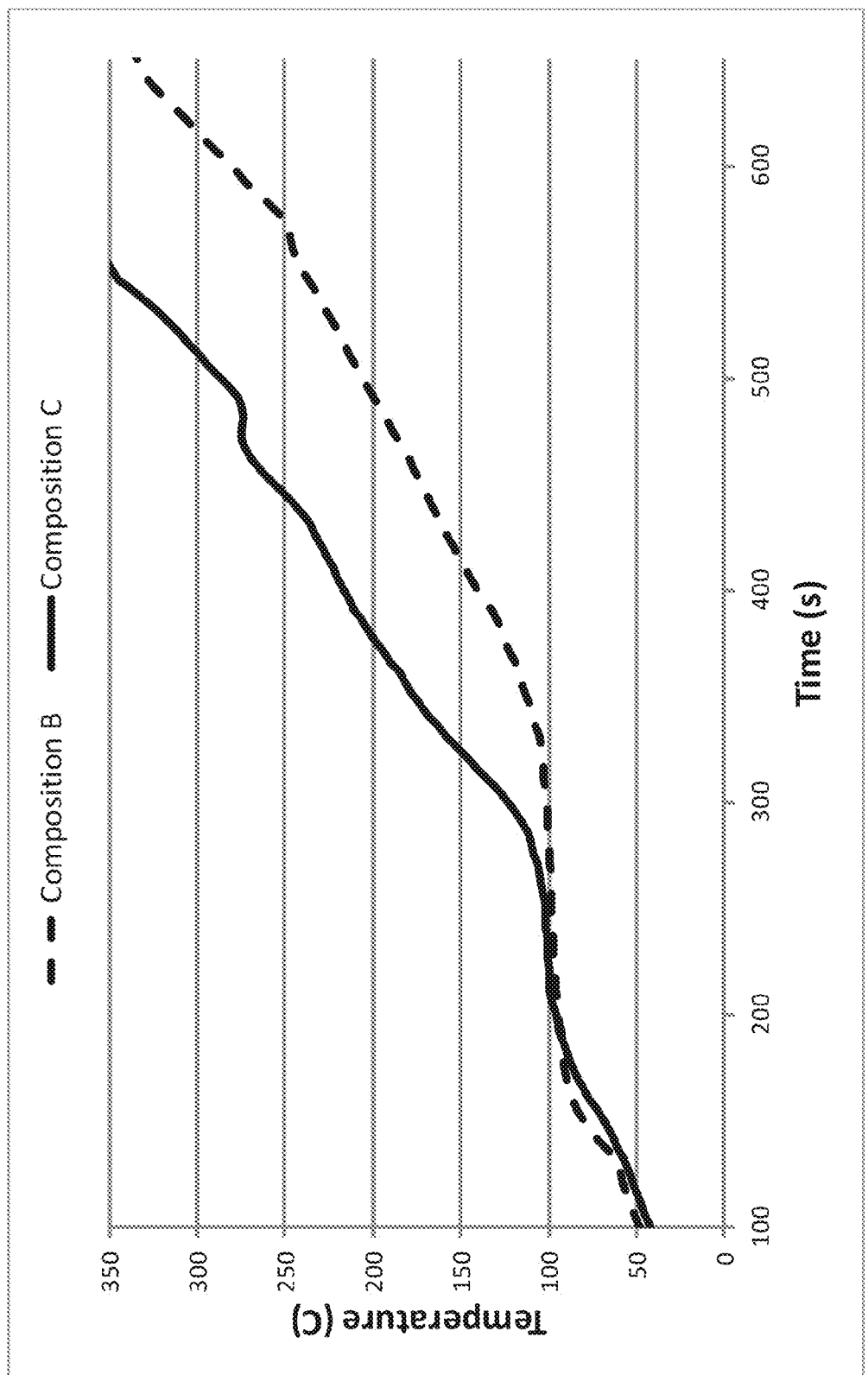
FIG. 6 shows the data for fire testing of hardwood plywood panels constructed with either protein-magnesium oxychloride adhesive formulation or soy-PAE adhesive formulation.
Figure 7:
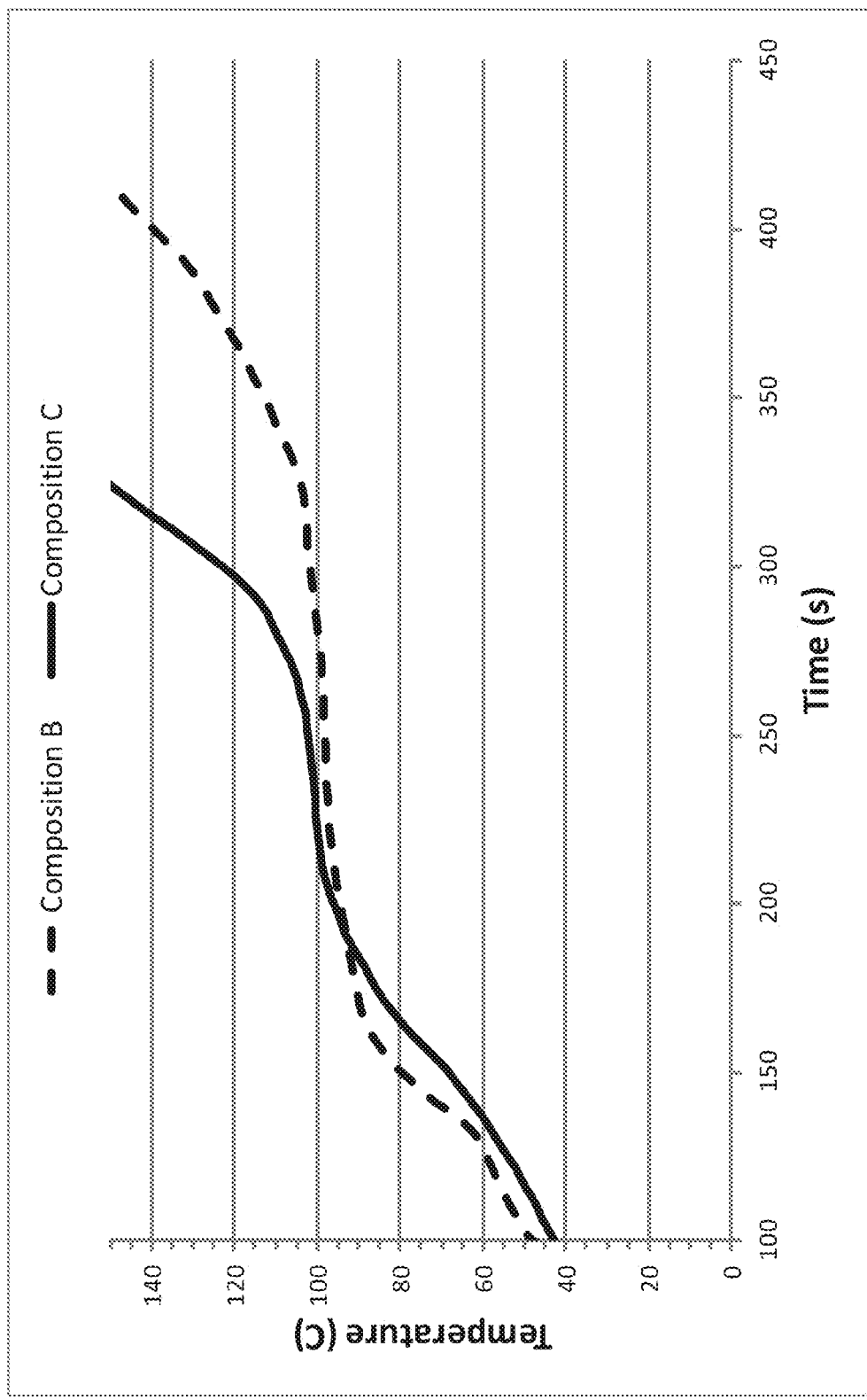
FIG. 7 shows enhanced data for testing of hardwood plywood panels constructed with either protein-magnesium oxychloride adhesive formulation or soy-PAE adhesive formulation.

FIG. 6 shows the fire test data for plywood panels prepared with composition B as well as those prepared with composition C. It is clear from the data that the time to 300° C. was significantly longer for the panel prepared with composition B (611 seconds) as compared to that made with composition C (511 seconds). Further analysis of the data, shown in FIG. 7, reveals panel prepared with composition C spent 95 seconds between 90 and 110° C. whereas the panel prepared with composition B spent 170 seconds. Given that the fire resistance of magnesium oxychloride cement is known to be linked to the evaporative cooling effect of bound water within the magnesium oxychloride cement matrix, this is strong evidence that composition B does have significant fire resistance potential. Furthermore, it supports the idea that a magnesium oxychloride cement matrix is being formed within the bond line.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An aqueous adhesive material comprising:
a magnesium oxychloride compound; and
proteinaceous material comprising a protein,
wherein a dry weight ratio of the protein in the proteinaceous material is at least about 40%, and
wherein a dry weight ratio of the magnesium oxychloride compound and the proteinaceous material in the aqueous adhesive material is at least about 50%.

2. The aqueous adhesive material of claim 1, wherein the magnesium oxychloride compound has a molar ratio of MgO to $MgCl_2$ of between about 1:1 and 30:1.

3. The aqueous adhesive material of claim 1, wherein the magnesium oxychloride compound has a molar ratio of MgO to $MgCl_2$ of between about 5:1 and 20:1.

4. The aqueous adhesive material of claim 1, wherein the magnesium oxychloride compound has a molar ratio of MgO to $MgCl_2$ of between about 10:1 and 15:1.

5. The aqueous adhesive material of claim 1, further comprising a vinyl polymer.

6. The aqueous adhesive material of claim 5, wherein the vinyl polymer is selected from the group consisting of polyvinyl alcohol (PVOH), polyvinyl acetate (PVAc) and vinyl acetate/ethylene (VAE), and mixtures thereof.

7. The aqueous adhesive material of claim 5, wherein the vinyl polymer is polyvinyl acetate (PVAc).

8. The aqueous adhesive material of claim 5, wherein the vinyl polymer is vinyl acetate/ethylene (VAE).

9. The aqueous adhesive material of claim 5, wherein the vinyl polymer is a combination of VAE and PVAc.

10. The aqueous adhesive material of claim 1, wherein the proteinaceous material is derived from one or more materials selected from the group consisting of soy, wheat, corn, cotton, rapeseed, peanut, algea, egg, milk, blood and mixtures thereof.

11. The aqueous adhesive material of claim 1, wherein the proteinaceous material is derived from soy.

12. The aqueous adhesive material of claim 1, wherein the proteinaceous material is derived from wheat.

13. The aqueous adhesive material of claim 1, wherein the proteinaceous material is derived from corn.

14. The aqueous adhesive material of claim 1, further comprising magnesium sulfate.

15. The aqueous material of claim 1, further comprising a phosphate of at least one selected from the group consisting of ammonium, aluminum, zinc, calcium, and potassium.

16. The aqueous adhesive material of claim 5, wherein a dry weight ratio of the vinyl polymer in the aqueous adhesive material is between about 1% and 30%.

17. The aqueous adhesive material of claim 1, wherein a dry weight ratio of the vinyl polymer in the aqueous adhesive material is between about 5% and 20%.

18. The aqueous adhesive material of claim 1, wherein a dry weight ratio of the vinyl polymer in the aqueous adhesive material is between about 10% and 15%.

19. The aqueous adhesive material of claim 1, wherein a dry weight ratio of the proteinaceous material in the aqueous adhesive material is between about 5% and 50%.

20. The aqueous adhesive material of claim 1, wherein a dry weight ratio of the proteinaceous material in the aqueous adhesive material is between about 20% and 30%.

* * * * *